(12) United States Patent
Espasa et al.

(10) Patent No.: US 9,436,468 B2
(45) Date of Patent: Sep. 6, 2016

(54) TECHNIQUE FOR SETTING A VECTOR MASK

(75) Inventors: Roger Espasa, Barcelona (ES); Roger Gramunt, Molins de Rei (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/286,735

(22) Filed: Nov. 22, 2005

(65) Prior Publication Data

US 2007/0118720 A1 May 24, 2007

(51) Int. Cl.
*G06F 15/00* (2006.01)
*G06F 9/30* (2006.01)
*G06F 9/38* (2006.01)

(52) U.S. Cl.
CPC ....... *G06F 9/30029* (2013.01); *G06F 9/30018* (2013.01); *G06F 9/30036* (2013.01); *G06F 9/30181* (2013.01); *G06F 9/3836* (2013.01)

(58) Field of Classification Search
USPC .......................................................... 712/5
See application file for complete search history.

(56) References Cited

U.S. PATENT DOCUMENTS

| | | | |
|---|---|---|---|
| 4,439,828 A * | 3/1984 | Martin | 712/226 |
| 5,214,763 A * | 5/1993 | Blaner et al. | 712/212 |
| 5,634,118 A * | 5/1997 | Blomgren | 712/226 |
| 5,761,476 A | 6/1998 | Martell | |
| 5,903,769 A * | 5/1999 | Arya | 712/5 |
| 5,925,124 A * | 7/1999 | Hilgendorf et al. | 712/227 |
| 5,940,625 A * | 8/1999 | Smith | 712/5 |
| 6,237,086 B1 * | 5/2001 | Koppala et al. | 712/226 |

FOREIGN PATENT DOCUMENTS

| | | |
|---|---|---|
| JP | 58-018754 A | 2/1983 |
| JP | 10-301791 A | 11/1998 |
| JP | 2003-520360 A | 7/2003 |
| WO | 00/45282 A1 | 8/2000 |

OTHER PUBLICATIONS

Espasa et al.; Tarantula: A Vector Extension to the Alpha Architecture; 2002; IEEE Computer Society; ACM SIGARCH Computer Architecture News, vol. 30, Issue 2; pp. 281-292.*
Non Final Office Action received for Taiwan Patent Application No. 095142370, mailed on Jan. 18, 2012, 11 Pages of Office Action and 12 Pages of English Translation.
Non Final Office Action received for Taiwan Patent Application No. 095142370, mailed on Mar. 30, 2010, 11 Pages of Office Action and 11 Pages of English Translation.
Non Final Office Action received for Taiwan Patent Application No. 095142370, mailed on Sep. 27, 2010, 9 Pages of Office Action and 9 Pages of English Translation.
Notice of Allowance received for Taiwan Patent Application No. 095142370, mailed on Jan. 9, 2013, 2 Pages of Notice of Allowance only.

(Continued)

*Primary Examiner* — Corey S Faherty
(74) *Attorney, Agent, or Firm* — Vecchia Patent Agent, LLC (57) ABSTRACT

A technique to generate a vector mask. In particular, at least one embodiment of the invention matches at least two instructions used in generating a vector mask and prevents at least one of the two instructions from executing if the correlation is found.

20 Claims, 5 Drawing Sheets

(56) References Cited

OTHER PUBLICATIONS

Notification to Grant Patent Right for Invention received for Chinese Patent Application No. 200610064083.6, mailed on Feb. 5, 2010, 3 Pages of Notification to Grant and 2 Pages of English Translation.
Office Action received for Chinese Patent Application No. 200610064083.6, mailed on Apr. 24, 2009, 5 pages of Office Action and 7 pages of English Translation.
Office Action received for Chinese Patent Application No. 200610064083.6, mailed on Jul. 25, 2008, 5 pages of Office Action and 7 pages of English Translation.
Office Action received for Chinese Patent Application No. 200610064083.6, mailed on Dec. 21, 2007, 6 pages of English Translation only.
Office Action Received for Japanese Patent Application No. 2006-313121, mailed on Dec. 6, 2011, 3 pages of Office Action and 4 pages of English Translation.
Office Action Received for Japanese Patent Application No. 2006-313121, mailed on Jan. 4, 2011, 4 pages of Office Action and 4 pages of English Translation.
Office Action received for Japanese Patent Application No. 2006-313121, mailed on Nov. 24, 2009, 4 pages of Office Action and 6 pages of English Translation.
Notice of Allowance received for Japanese Patent Application No. 2009525665, mailed on Apr. 1, 2014, 3 Pages of Notice of Allowance only.
Office Action Received for Japanese Patent Application No. 2012-087415, mailed on Jul. 9, 2013, 3 pages of Office Action and 3 pages of English Translation.

\* cited by examiner

TECHNIQUE FOR SETTING A VECTOR MASK

FIELD

Embodiments of the invention relate to microprocessor architecture. More particularly, embodiments of the invention relate to setting a vector mask for use by an instruction set architecture.

BACKGROUND

Figure 1:
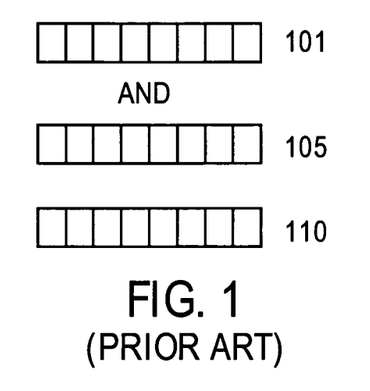
FIG. 1 illustrates a prior art technique for generating a vector mask value.

Instructions used in various instructions set architectures (ISAs) in various processors may include operations that involve either or both generating a mask value that is to be logically combined with another value to produce a resultant value. A mask value may be stored in a memory location, such as a register ("vector mask"), and contain a number of bits that are to be used in a Boolean logic operation (e.g., "AND" operation) with a corresponding number of bits of another value. FIG. 1, for example, illustrates a vector mask 101 whose bits are to be logically combined via a Boolean AND operation with the bits of another value stored in another register 105 to yield a resultant value stored in a resultant register 110.

In some ISAs, instructions may be designated as being instructions that use a mask value to generate a result. For example, if an instruction is designated as being executed "under mask", a data value used by or produced by the instruction may be stored in a processor registers, such as a "vector register". In turn, operations performed on data stored in the vector register element may check the corresponding bit in the vector mask, which may be stored in a "vector mask register". If a corresponding bit is set at a certain value, the operation may be carried out without regard to the vector mask. On the other hand, if the bit is set to another value, the operation may be ignored, for example, and no exceptions and/or results are produced for that operation. The number of bits within the vector mask and the meaning of each bit in the vector mask may vary according to the processor architecture in which it's implemented.

Vector masks can be initialized or "set" through various techniques, including using an operation or sequence of operations, such as operations decoded from an instruction ("uop"), to set the vector mask from another registers, such as a scalar register. Alternatively, some prior art techniques set the vector mask implicitly through the performance of other operations, such as a "compare" operation. In one prior art technique, a vector mask is set using a first operation to compare (e.g., "veq" operation) a mask value with another value, such as a vector of "zero" values, to produce a value that can then be stored into the vector mask by performing a second operation to set the vector mask (e.g., "setvm" operation).

Some prior art techniques have used an operation or operations to generate a vector mask value and another operation or operations to store the vector mask in a storage location, such as a register, from which the vector mask may be applied to various instructions that use it.

One shortcoming of prior art techniques, such as the one described above, is that two or more operations must be performed to ultimately set the vector mask before it can be used, which requires extra processing cycles, thereby impacting processing performance.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention pertain to microprocessor architecture. More particularly, embodiments of the invention pertain to techniques to set a vector mask for use by one or more instruction operating within a processor or processing system.

In at least one embodiment of the invention, a vector mask may be configured ("set") in order to enable or disable various function associated with one or more instructions operating within a processor or processing system by matching at least one instruction to set a, mask value with at least one instruction to set a vector mask. In at least one embodiment, the matching is performed by searching through a list of operations for a youngest operation to be performed that sets a vector mask value before the performance of an operation to set a vector mask with the vector mask value. Furthermore, at least one embodiment of the invention dispenses with, or at least ignores, the execution of the instruction(s) to set the vector mask and instead executes the instruction to set the mask value in order to set the vector mask to the corresponding value.

Figure 2:
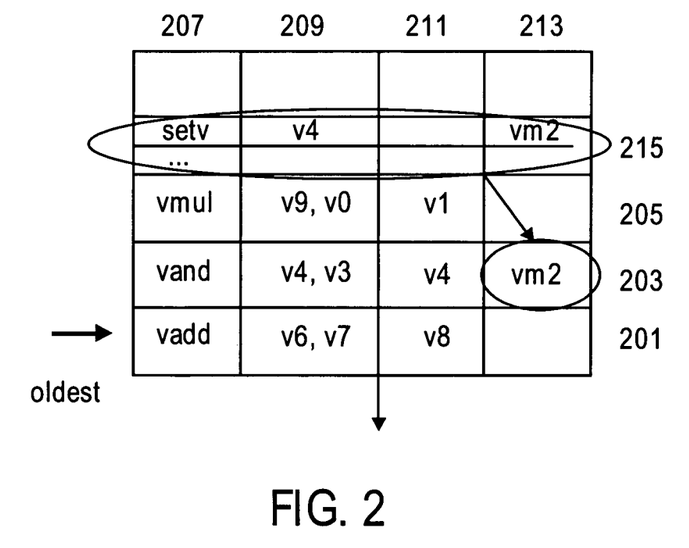
FIG. 2 illustrates a technique to set a vector mask according to one embodiment.

FIG. 2, for example, illustrates a technique to set a vector mask according to one embodiment. In FIG. 2 illustrates an instruction queue 200, such as a scheduler, to store instructions or uops to be executed by processing logic. In the example illustrated in FIG. 2, various instructions/uops are stored in the queue at different times and stored in order of when they entered the queue (i.e., "oldest" to "youngest"). For example, in FIG. 2, an instruction or uop identified by the operation code ("opcode"), "vadd", has entered the queue first and is therefore stored at entry 201, followed by an instruction/uop identified by the opcode, "vand", stored at entry 203, and an instruction/uop identified by the opcode, "vmul", at entry 205. In other embodiments, instructions/uops may or may not be stored in order of their arrival into the queue, or alternatively, they may be stored in different locations, such as from the "top" of the queue to the "bottom".

Each instruction/uop in the queue of FIG. 2 has a corresponding opcode 207, as discussed above, as well as a corresponding source location identifier 209 that identifies the location within a storage location, such as a register, where data to be operated upon by the instruction/uop is located. Similarly, each instruction/uop in the queue of FIG. 2 has a corresponding destination location identifier 211 that identifies the location within a storage area, such as a register, where data produced by the execution of the corresponding instruction/uop is to be stored. In at least one embodiment, each entry within the queue also stores a corresponding vector mask destination location identifier 213 that identifies the location within a storage area, such as a register, where a vector mask produced by the instruction/uop is to be stored. Some uops/instructions may not have any information stored within the vector mask destination location identifier 213 of their queue entry, particularly if the corresponding uop/instruction doesn't yield a vector mask value after it is executed.

In FIG. 2, the vand instruction/uop, for example, is to perform a Boolean "AND" operation between data corresponding to the source field and destination field of its entry and store the result into a location indicated by the destination field of its queue entry. Also in FIG. 2, a fourth instruction/uop has entered the queue at entry 215, identified by the opcode "setvm". The setvm instruction/uop is an operation, which when executed, will store a vector mask value whose location is identified by the vector mask identifier field into a vector mask identified.

In the example illustrated in FIG. 2, the location of the mask value corresponding to the setvm instruction/uop is the same as the location of the mask value corresponding to the vand instruction/uop. At least one embodiment of the invention recognizes the relationship between setvm and vand in FIG. 2 as corresponding to the same vector mask value and then either removes the setvm instruction/uop from the queue or otherwise does not execute the setvm instruction/uop, and uses the destination identifier of the vand instruction/uop as the location of the vector mask to be used by an instruction/uop.

In one embodiment, when the setvm instruction/uop illustrated in FIG. 2 is detected within the queue of FIG. 2, searching logic or searching software or some combination thereof can locate the corresponding vand operation in the queue by searching a set of content addressable memories (CAMs), for example, corresponding to each entry of the queue. In one embodiment, a CAM set to a first value (e.g., logical "1") may indicate the location in the queue of a vand instruction/uop that generates and stores a vector mask value to be used by the setvm instruction/uop. In other embodiments, other techniques may be used to identify the location within the queue of the vand instruction/uop.

Figure 3:
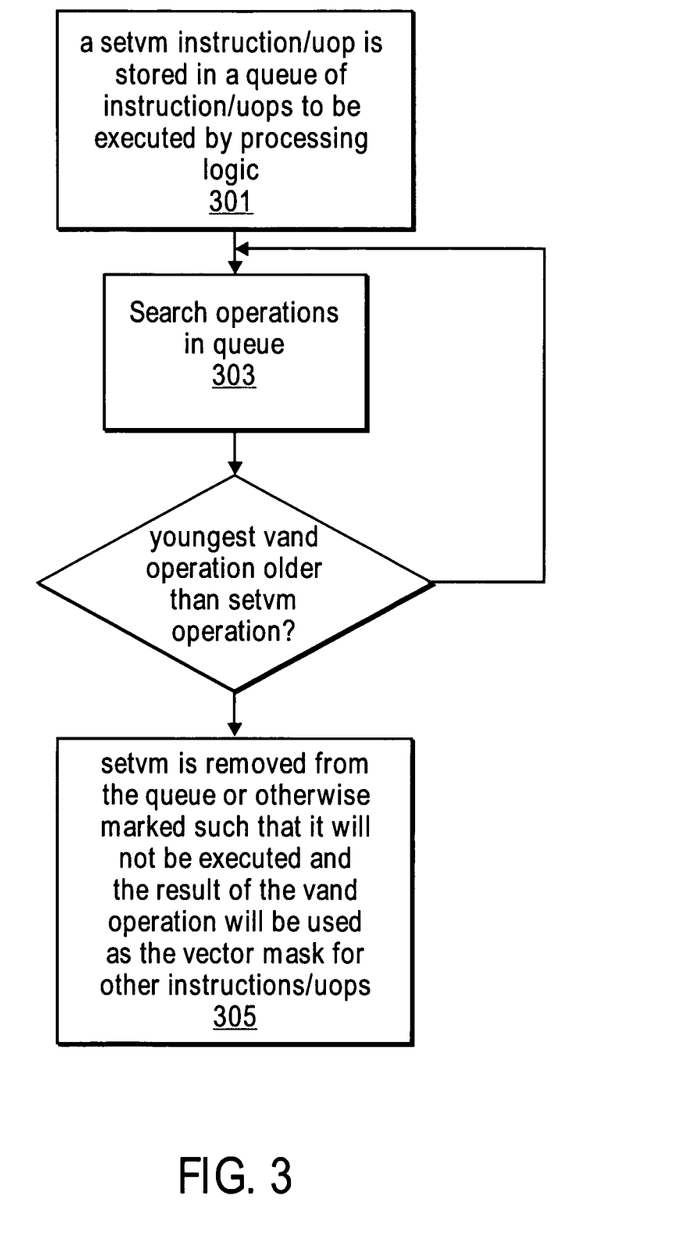
FIG. 3 is a flow chart illustrating at least one aspect of at least one embodiment of the invention.

FIG. 3 is a flow chart illustrating at least one aspect of at least one embodiment of the invention. In particular, FIG. 3 illustrates operations to be performed to detect the presence of a setvm instruction/uop within a queue, such as a scheduler, and locate the corresponding mask-generating instruction/uop (e.g., vand, in one embodiment), such that the setvm instruction/uop does not have to be performed. At operation 301, a setvm instruction/uop is stored in a queue of instruction/uops to be executed by processing logic. At operation 303, queue entries older than the setvm instruction/uop are searched to find the youngest vand instruction/uop in the queue corresponding to the same vector mask value as the setvm instruction/uop. After the youngest corresponding vand instruction is located, the setvm is removed from the queue or otherwise marked such that it will not be executed and the result of the vand operation will be used as the vector mask for other instructions/uops at operation 305.

In one embodiment, the queue is a scheduler in a processor, whereas in other embodiments, it may be another queue within or outside of a processor to store instructions or uops to be performed by processing logic. Furthermore, although reference has so far been made to setvm and vand instructions/uops, in other embodiments, other instructions/uops may be used to generate a vector mask value and set a vector mask with that value, depending upon the instruction set architecture in which embodiments of the invention are used.

Figure 4:
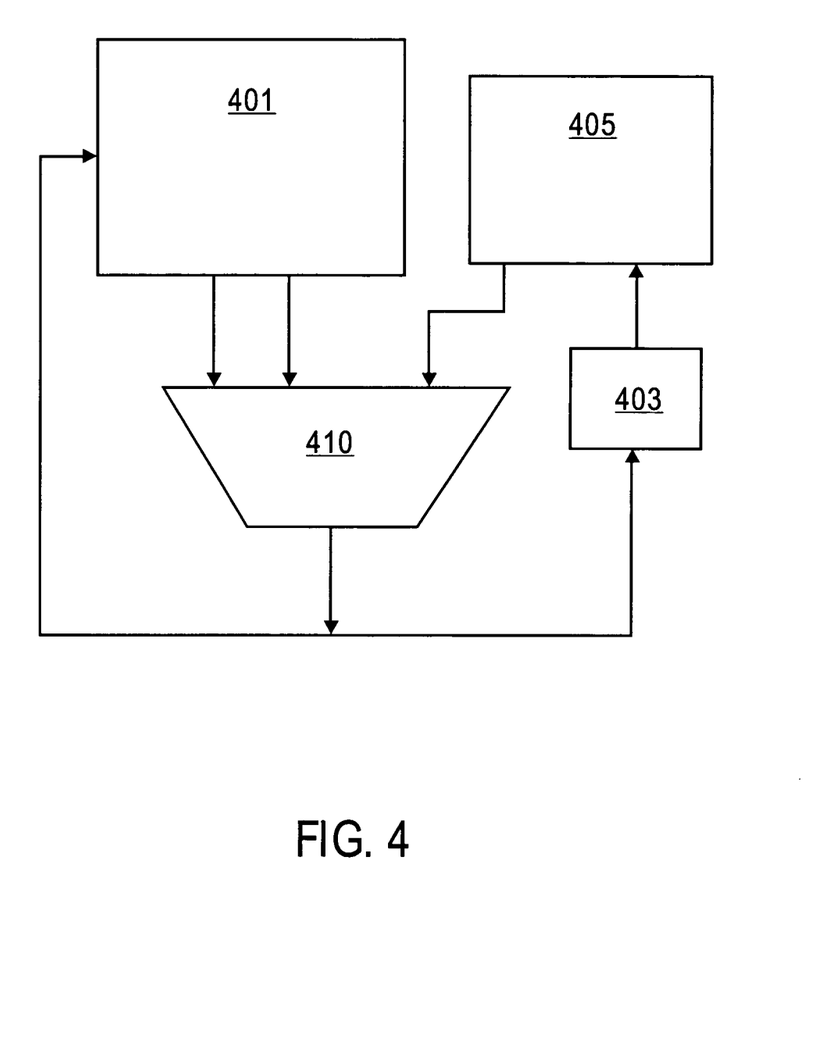
FIG. 4 illustrates hardware logic that can be used to implement at least some of the operations discussed in reference to at least one embodiment of the invention.

Embodiments of the invention may be implemented in various ways, including software, hardware, or some combination thereof. FIG. 4, for example, illustrates hardware logic that can be used to implement at least some of the operations discussed in reference to at least one embodiment of the invention. In particular, FIG. 4 illustrates a vector register file 401 that includes source and destination registers used to store operands and results corresponding to instructions/uops, such as setvm and vand. In addition, FIG. 4 illustrates a vector mask register file 405 to store vector masks generated by one or more embodiments of the invention. A vand instruction/uop, for example, may cause the arithmetic logic unit (ALU) 410 to perform a Boolean AND operation between data stored in two or more of the source registers in the vector register file and store the result in a destination register within the vector register file and/or a vector mask register within the vector mask register file.

In one embodiment, the result of the vand instruction/uop will only store the result in the vector mask register file if the vector mask value does not contain all zeros, by performing a compare operation with compare logic 403. In some embodiments, the vector mask value stored in the vector mask register file may be used in other logical operations performed in the ALU, as facilitated by the connection from the vector mask register file to the ALU. In one embodiment, one of the source registers used by the vand operation contains at least one non-zero bit, which is ANDed with a source register value containing all zeros, such that the vector mask value generated will reflect the register locations of the non-zero bits stored in the first source register. This mask value can be used by subsequent instructions by accessing the mask from the vector mask register file.

Figure 5:
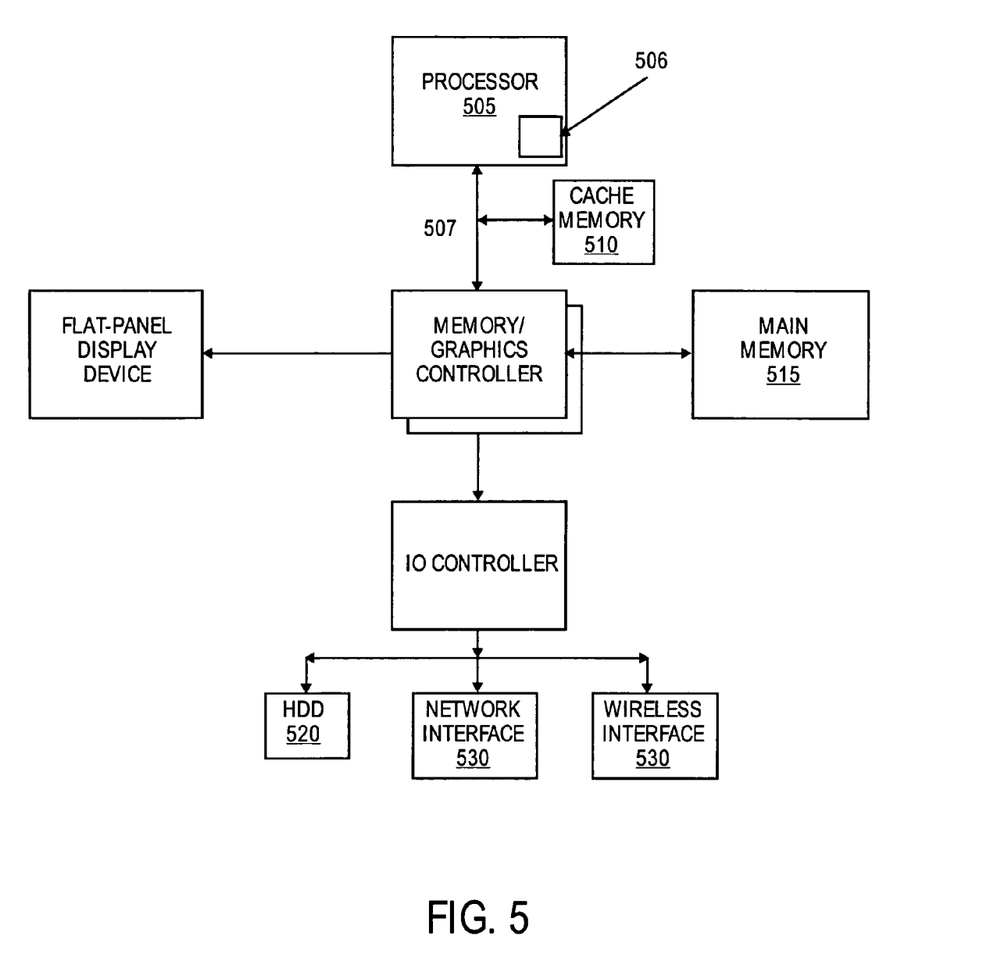
FIG. 5 illustrates a front-side-bus (FSB) computer system in which one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is a storage area 506 for machine state. In one embodiment storage area may be a set of registers, whereas in other embodiments the storage area may be other memory structures. Also illustrated in FIG. 5 is a storage area 507 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 6:
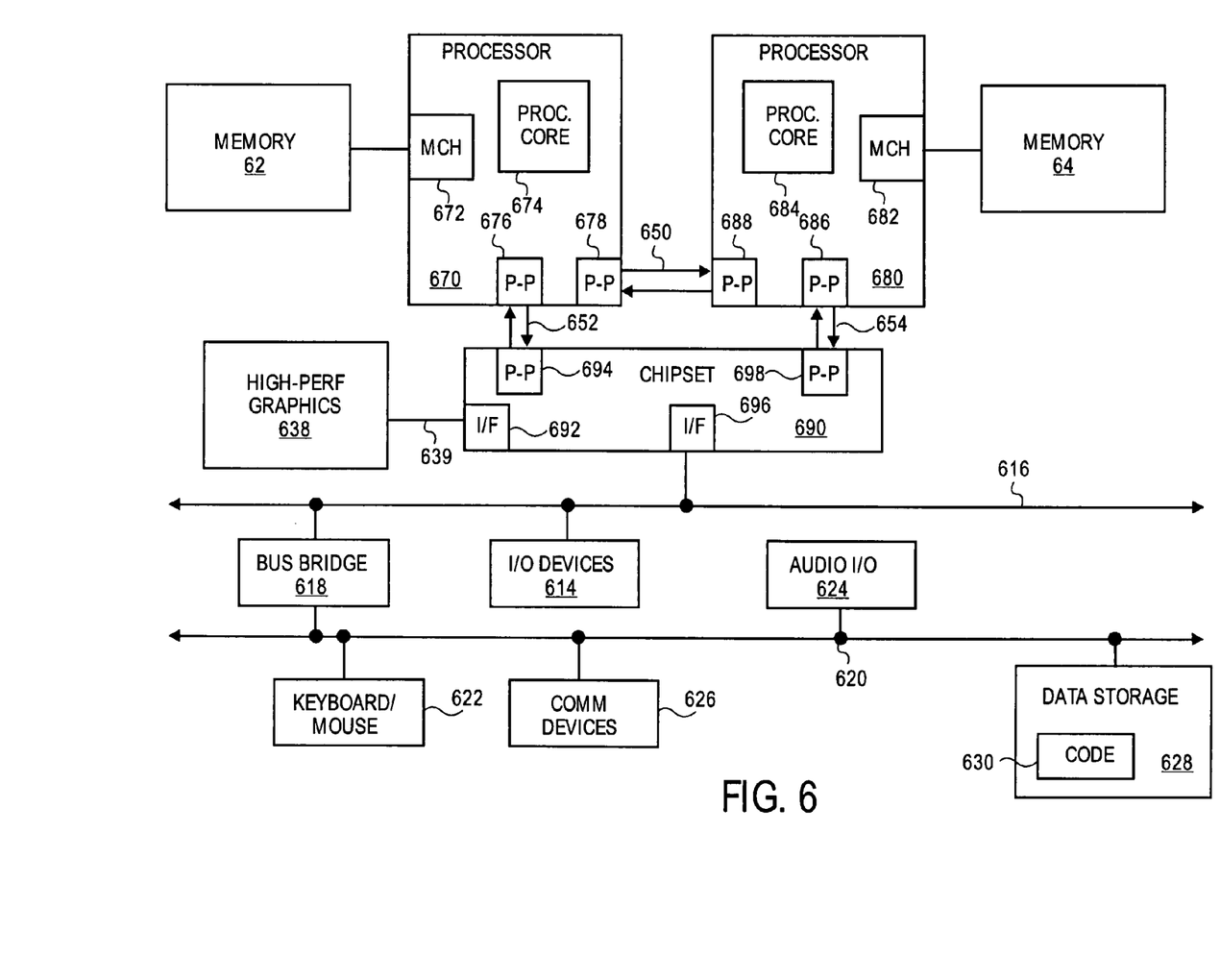
FIG. 6 illustrates a computer system that is arranged in a point-to-point (PtP) configuration.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Various aspects of embodiments of the invention may be implemented using complimentary metal-oxide-semiconductor (CMOS) circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor comprising:
    a first logic to detect a first decoded operation of a first instruction to store a vector mask value in a vector mask register;
    a second logic to identify a second decoded operation of a second instruction that is a vector instruction to generate the vector mask value; and
    a third logic to prevent the first decoded operation from being performed if the second decoded operation is identified; and
    a unit to perform the second decoded operation to generate the vector mask value and to store the generated vector mask value to the vector mask register.

2. The processor of claim 1, wherein the second decoded operation is to be older than the first decoded operation.

3. The processor of claim 2, wherein the second logic includes a content addressable memory to store a bit to identify the second decoded operation as being older than the first decoded operation.

4. The processor of claim 1, further comprising a unit to perform the second decoded operation to store the vector mask value in the vector mask register.

5. The processor of claim 1, wherein the second decoded operation includes a Boolean AND operation whose result is to be stored in the vector mask register.

6. The processor of claim 1, comprising a scheduler to store the first decoded operation and the second decoded operation in an order in which they are to be performed.

7. The processor of claim 6, wherein the first decoded operation is to be removed from the scheduler if the second decoded operation is identified.

8. A system comprising:
    a memory to store a first instruction and a second instruction, the first instruction to store a vector mask value in a vector mask register, the second instruction, which is a vector instruction, to generate the vector mask value; and
    a processor to store the vector mask value in the vector mask register while performing the second instruction, which is the vector instruction, when a destination register of the second instruction matches a source register of the first instruction, and to omit performing the first instruction.

9. The system of claim 8, wherein the processor includes a scheduler to schedule the first instruction and the second instruction for execution, and wherein the scheduler is to detect that the destination register of the second instruction matches the source register of the first instruction.

10. The system of claim 8, further including a search logic to find an operation corresponding to the first instruction after it has been stored within the processor.

11. A method comprising:
    detecting a first decoded operation of a first instruction to store a vector mask value in a vector mask register;
    identifying a second decoded operation of a second instruction, which is a vector instruction, to generate the vector mask value;
    preventing the first decoded operation from being performed if the second decoded operation is identified; and
    performing the second decoded operation to generate the vector mask value and to store the generated vector mask value to the vector mask register.

12. The method of claim 11, wherein preventing includes removing the first decoded operation from an instruction queue if the second decoded operation is identified.

13. The method of claim 11, wherein the second decoded operation is older than the first decoded operation.

14. The method of claim 11, further comprising storing a bit in a content addressable memory identifying the second decoded operation as being older than the first decoded operation.

15. The processor of claim 1, wherein the first logic is to detect the first decoded operation in an instruction queue and the second logic is to detect the second decoded operation in the instruction queue.

16. A processor comprising:
    an instruction queue to queue:
        a second decoded operation of a second vector instruction, wherein the second vector instruction if performed is to generate a vector mask value and is to store the generated vector mask value in a vector register; and a first decoded operation of a first instruction, wherein the first instruction if performed is to store the vector mask value from the vector register to a vector mask register; and a unit, when the first and second decoded operations are detected in the instruction queue, to store the vector mask value in the vector mask register without the vector mask value being stored in the vector register.

17. The processor of claim 16, wherein the instruction queue is to prevent the first decoded operation of the first instruction from being performed.

18. The processor of claim 16, wherein the second instruction is to indicate the vector register as a destination.

19. The processor of claim 1, wherein the second instruction is to indicate a vector register as a destination, and wherein when the second decoded operation is performed the vector mask value is to be stored in the vector mask register instead of in the vector register.

20. The processor of claim 1, wherein the first instruction if performed is to store the vector mask value from a given storage location to the vector mask register, and wherein the second logic is to detect that the second operation is to store the generated vector mask value to the given storage location.

* * * * *